United States Patent [19]
Cavill

[11] Patent Number: 6,003,069
[45] Date of Patent: Dec. 14, 1999

[54] CLIENT/SERVER PRINTER DRIVER SYSTEM

[75] Inventor: Barry Richard Cavill, Lexington, Ky.

[73] Assignee: Lexmark International, Inc., Lexington, Ky.

[21] Appl. No.: 08/991,380

[22] Filed: Dec. 16, 1997

[51] Int. Cl.⁶ ................................................. G06F 13/00
[52] U.S. Cl. .................... 709/205; 709/201; 709/203; 709/301
[58] Field of Search ................... 395/200.33, 200.35, 395/200.31, 681; 709/203, 205, 201, 301

[56] References Cited

U.S. PATENT DOCUMENTS

| | | | |
|---|---|---|---|
| 4,731,750 | 3/1988 | Hoflich et al. | 709/201 |
| 5,220,674 | 6/1993 | Morgan et al. | 709/223 |
| 5,533,174 | 7/1996 | Flowers, Jr. et al. | 395/114 |
| 5,577,172 | 11/1996 | Vatland et al. | 395/114 |
| 5,580,177 | 12/1996 | Gase et al. | 400/61 |
| 5,657,446 | 8/1997 | Pinard et al. | 379/90.01 |
| 5,867,633 | 2/1999 | Taylor, III et al. | 709/104 |

*Primary Examiner*—Zarni Maung
*Assistant Examiner*—Saleh Najjar
*Attorney, Agent, or Firm*—Gregory J. Kirsch; D. Brent Lambert

[57] ABSTRACT

A client/server printer driver including a client-side subsystem capable of transmitting a print job to a server-side subsystem capable of receiving the print job from the client-side and processing the print job and sending the processed data back to the client-side for output. A client/server printer driver including a client-side subsystem capable of dividing the print job into portions to be processed client-side and server-side and then transmitting the server-side portions of the job to a server-side subsystem capable of processing the client-side portions of the print job to create and receiving the processed server-side portions. The system has a server-side subsystem capable of receiving the server-side portions from the client-side subsystem and processing these portions to create processed server-side portions and transmitting the server-side portions to the client-side.

30 Claims, 6 Drawing Sheets

PRINTER DRIVER SYSTEM BLOCK DIAGRAM

PRINTER DRIVER SYSTEM BLOCK DIAGRAM

PRINTER DRIVER SYSTEM BLOCK DIAGRAM

PRINTER DRIVER SYSTEM BLOCK DIAGRAM

CLIENT/SERVER PRINTER DRIVER SYSTEM

BACKGROUND OF THE INVENTION

1. Field of the Invention

The present invention relates to printer drivers. In particular, the present invention relates to a client/server printer driver system useful for carrying out print jobs on Network Computers ("NCs"), network appliances, and other non PC devices capable of printing.

2. Background of the Invention

Network Computers are small computers that are connected to a local area network ("LAN") or to the Internet and contain significant local processing intelligence. Such NCs are capable of running applications that are either downloaded from the LAN or Internet or are loaded from unalterable local storage (e.g., read-only CD-ROM). NCs generally have no local permanent storage, instead storing information remotely. Thus, NCs are highly dependent on the network. Furthermore, NCs are characterized by the usage of nontraditional operating systems, often using television monitors for displays and having limited local capabilities. The presently contemplated target markets for NCs are:

Home—Designed for ease of use, novice customers

Education—Permits less expensive solution than traditional PC's with more control Business—Less expensive connections and more control at server/MIS level Similarly, network appliances (such as Internet telephones, etc.) are special-purpose devices that contain computing capability and may connect to a centralized server, LAN, or the Internet.

Traditional Personal Computer ("PC") printer drivers are designed to be used on the PC where the application that is generating the print request resides. One sample driver system is shown in FIG. 1. The application 130 converts the desired print data into GDI 132 or other text commands and graphics primitives with associated page positions and/or forms controls. The print job may be spooled 150 (i.e., stored) to allow the user to resume working with the application 130. These commands may be formatted by the driver 100 into a recognizable industry defined data definition (e.g. PCL) or the printer driver 100 may use the application 130 and/or platform intermediate commands (e.g., Microsoft Windows™ GDI primitives) and act on these commands to create internal direct printer commands 170 to control the printer hardware 120. The printer does not necessarily need to be physically attached to the PC 110 where the application 130 and driver 100 reside, but may be remotely located such as on a LAN network (not shown).

One benefit of having a PC-side printer driver system is the movement of the processing into the PC itself (rather than at the printer), thereby permitting more flexibility and control. Another benefit of this system is that more advanced functions are possible by using a more powerful host PC, while permitting cost minimization of the printer hardware itself.

As one tries to fit the traditional host based printer driver models into the Network Computer model (as shown in FIG. 2), there are problems that result from limitations of the NC. Problems with current solutions in NC environments stem from the fact that NC devices have only a very limited amount of random access memory ("RAM") and no permanent storage (to allow them to achieve their minimal cost targets). In contrast, almost all standard PC printer drivers use local spooling to the local permanent storage. This is generally not possible with an NC. Also with small amounts of local RAM, 4 MB typically, there is often insufficient memory for the driver, application, and print data, especially if there are color bitmaps or complex graphics images to be printed. Also, many of the NC devices that are being developed today have different operating systems and have different API and/or GDI interface definitions which makes developing a printer driver extremely cumbersome. Thus, the additional platform support requires generation of new software drivers.

Traditional printing implementations on NCs 210 (FIG. 2) have followed the standard printing model. For instance, in the NC system, a server 200 is used to load applications 130, communicate with the network, and store data needed by the NC 210. The NC 210 itself runs the application 130 which might request printing. The other implementation details are the same as in the standard printing model for PCs (see FIG. 1).

The benefits of this traditional NC printing model are 1) its similarity to current driver models and 2) that GUI models are known by platform already. However, the NC system raises the following drawbacks of this printing model. There are severe memory and graphics limits on NCs. Also, NC hardware differences present unique issues with respect to operation of software thereon and the hardware which may be connected to an NC. Also, the traditional spooling system may be unacceptable where the NC is limited in storage space and/or memory and, therefore, potentially unable to handle even modest size print jobs, especially those containing significant amounts of graphical data. This printing system does not work with NCs that have minimal RAM.

SUMMARY OF THE INVENTION

In view of these drawbacks, the present invention presents a new printer driver system which is surprisingly effective for use with NCs. In its simplest terms, the present invention divides the print task up into portions that can be processed locally and portions that can be processed by a server. Typically, the server will be more capable of processing data than the NC and will have a greater amount of storage space. The benefits of the invention are that the server is used for temporary storage and processing, thereby alleviating the burden on the NC. Printing of more complex, high quality information is more feasible than using the traditional driver inside the NC.

The present invention overcomes the limitations of the NC devices, but still permits the customer the opportunity to print in accord with the graphical capabilities that are currently enjoyed today. Using the present invention, the problems of lack of capability for saving the intermediate data (spooling) and lack of space for creating the graphical images are eliminated. The difficult tasks of creating complex bit maps for printing are moved to the server where there is plenty of processing capability and storage. In essence, the driver is split between the NC and the server, with each part performing the tasks that are best suited for the systems on which they reside. An additional job management section is added to permit initiation of print image creation tasks on the server and to manage the response and interaction between the server and driver software in the NC. There is an increase in the network traffic between the NC and server while printing, but this is a minor problem (especially for an Intranet environment where fast links with significant bandwidth are in place) in comparison with the greatly enhanced functionality provided by the invention.

The present invention also provides a selectable location of driver function processing.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

Figure 1:
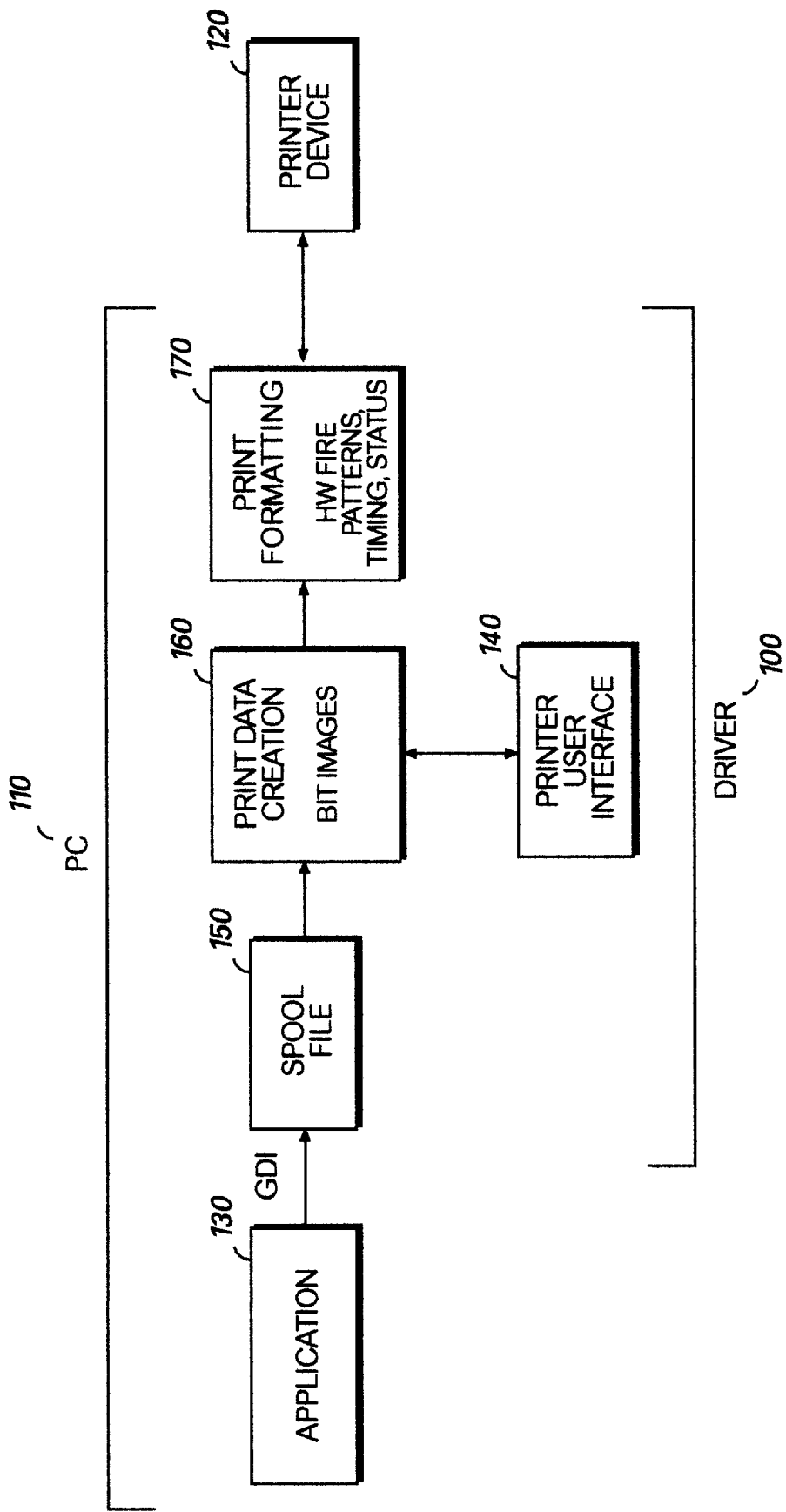
FIG. 1 is a block diagram of a prior art PC-based printer driver system.
Figure 2:
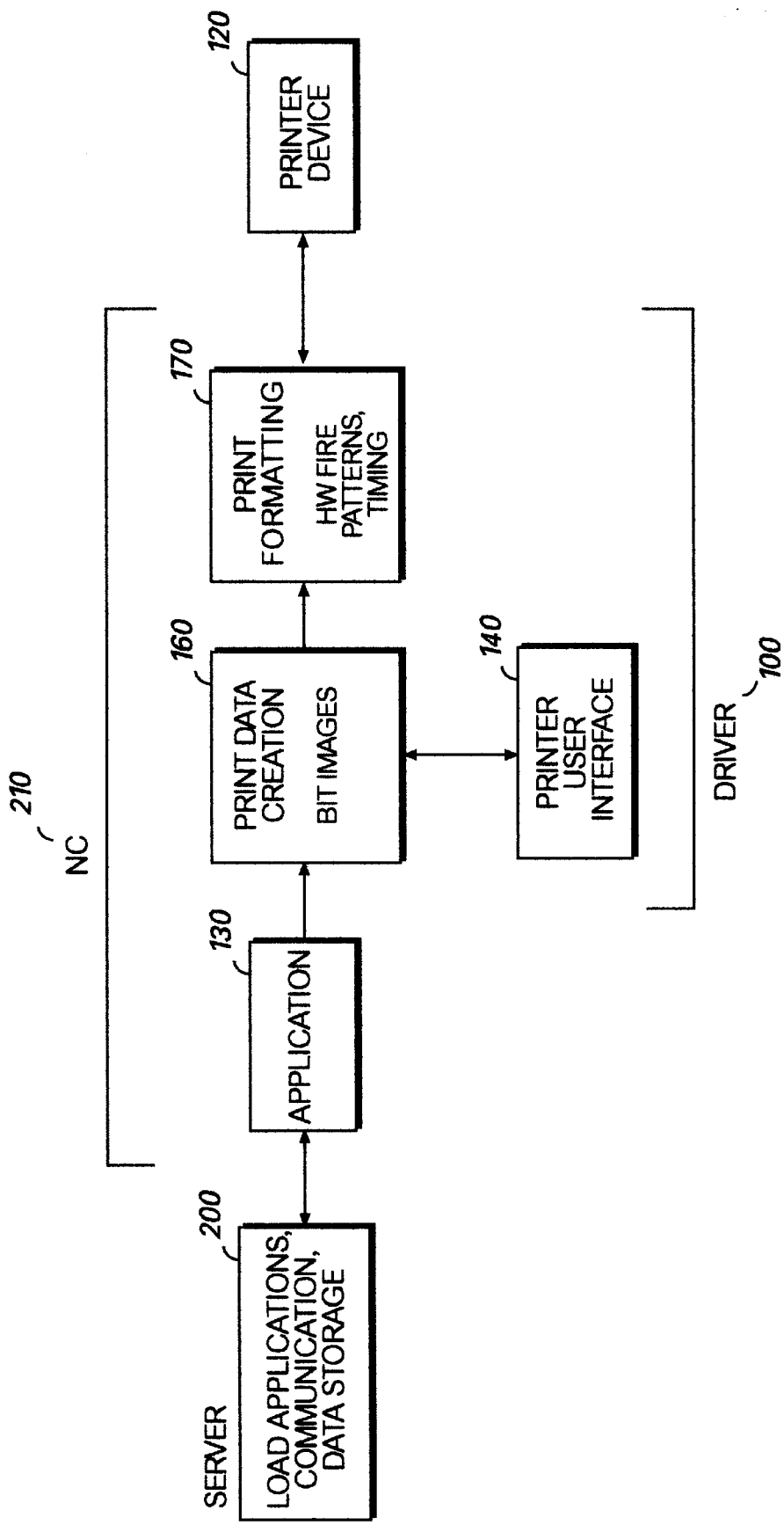
FIG. 2 is a block diagram of a traditional driver system applied to a Network Computer (NC) device.

The present invention may be understood more readily by reference to the following detailed description of preferred embodiments of the invention and the Figures.

Before the present methods and apparatuses are disclosed and described, it is to be understood that the terminology used herein is for the purpose of describing particular embodiments only and is not intended to be limiting. It must be noted that, as used in the specification and the appended claims, the singular forms "a," "an" and "the" include plural referents unless the context clearly dictates otherwise.

While the present invention is particularly suitable for use in conjunction with NCs, it should be noted that the client/server printer driver model is not necessarily limited to NCs and could be used in any instance where diversion of the print data creation task away from the requesting computer might be desirable.

As noted above, the present invention presents a new printer driver system which is surprisingly effective for use with NCs. The present invention divides the print task up into portions that can be processed locally and portions that will be processed by a server. The server typically will be more capable of processing than the NC and will have a greater amount of storage space. The server is used for temporary storage and processing, thereby alleviating the burden from the NC.

Under the present invention, if the driver is written in a platform independent language such as the JAVA® programming language, then the same driver software can be used on any NC device that supports the Java Virtual Machine (JVM) definition. The only additional requirement for this platform independence is the definition of a common API that is the source of the graphics and text primitives.

The present invention provides a system for processing a print job using a client/server printer driver for use with a client-side computing means in communication with at least one server-side computing means. The system comprises a client-side subsystem, a server-side subsystem, and means, in communication with the client-side driver subsystem, for outputting the processed print job to a signal processing means. The client-side driver subsystem itself includes means for transmitting the print job to a server-side driver subsystem of the server-side computing means. The server-side driver subsystem includes means for receiving the print job from the client-side driver subsystem transmitting means. The server-side driver subsystem also includes means for processing the print job to thereby create a processed server-side print job. The server-side subsystem also includes means for transmitting the processed server-side print job to the client-side driver subsystem. Finally, the client-side driver subsystem further comprises means for receiving the processed server-side print job from the server-side subsystem.

The present invention also provides a client/server method of processing a print job for use with a client-side computing means in communication with at least one server-side computing means. This method includes, but is not limited to, the steps of transmitting, from the client-side, the print job to the server-side computing means. Next, the method includes receiving, at the server-side, the print job from the client-side transmitting means and processing, again on the server-side, the print job to create a processed print job. This processed print job is then transmitted, on the server-side, to the client-side and is received and output by the client-side to a signal processing means.

For instance, the signal processing means can be a printer capable of receiving and printing the print job. This method could further comprise receiving the print job and printing the print job on the printer.

Also, the present invention provides a system for processing a print job using a client/server printer driver for use with a client-side computing means in communication with at least one server-side computing means. This system includes a client-side driver subsystem. This subsystem includes means for dividing the print job into one or more portions to be processed client-side, server-side, or a combination thereof. In addition, the client-side driver subsystem includes means, responsive to the dividing means, for transmitting the server-side portions of the print job to a server-side driver subsystem of the server-side computing means. The client-side subsystem further includes means for processing the client-side portions of the print job to thereby create one or more processed client-side print job portions. The client-side subsystem further includes means for receiving the processed server-side print job portions, and possibly combining the results with client-side results to create a total result.

In addition, this system also includes a server-side driver subsystem which includes means for receiving the server-side portions of the print job from the client-side driver subsystem transmitting means. The server-side subsystem also includes means for processing the server-side portions of the print job to thereby create one or more processed server-side print job portions. Finally, the server-side subsystem includes means for transmitting the one or more processed server-side print job portions to the client-side driver subsystem.

The system also includes means in communication with the client-side driver subsystem for outputting the processed client-side and server-side print job portions to a signal processing means (e.g., a printer).

The client-side portions of the print job can correspond to textual information and the server-side portions of the print job correspond to graphical information, or other arrangements based on client and server capabilities.

In addition, the dividing means may further comprise means for determining the amount of communication between the client and server-side computing means and, if the amount is within a predetermined threshold range, dividing the print job whereby one or more portions to be processed client-side, server-side, or a combination thereof are favored based upon minimization of the communication between client-side and server-side computing means, memory capacity, processor speed, etc. Also, the server-side computing means is a computer operating on a network and the network can be a local area network or is the Internet.

The present invention also provides a client/server method of processing a print job for use with a client-side computing means in communication with at least one server-side computing means. The method includes, but is not limited to, the following steps. First, dividing, on the client-side, the print job into one or more portions to be processed client-side, server-side, or a combination thereof. Next, transmitting, from the client-side, the server-side portions of the print job to the server-side computing means. Then, processing, on the client-side, the client-side portions of the print job to thereby create one or more processed client-side print job portions and receiving, on the server-side, the server-side portions of the print job from the client-side transmitting means. Thereafter, processing, on the server-side, the server-side portions of the print job to thereby create one or more processed server-side print job portions and transmitting, on the server-side, the one or more processed server-side print job portions to the client-side. Finally, receiving, on the client side, the processed server-side print job portions and outputting the processed client-side and server-side print job portions to a signal processing means (e.g., a printer).

The signal processing means may be a printer capable of receiving the client-side and server-side print job portions and printing the print job. The client-side portions of the print job can correspond to textual information and the server-side portions of the print job can correspond to graphical information, or other logical arrangements or divisions of tasks. Alternately, the client-side and server-side portions can relate to "low"/"medium" and "high" quality portions, respectively. As shown in the examples below, there can be multiple client-side or server-side portions and, thus, by way of example only, the "low" and "medium" quality portions could be processed separately locally. See, e.g., FIG. 6.

Moreover, the dividing step further comprises determining the amount of communication between the client and server-side computing means and, if the amount is within a predetermined threshold range, dividing the print job whereby one or more portions to be processed client-side, server-side, or a combination thereof are favored based upon minimization of the communication between client-side and server-side computing means, processor speed, RAM, permanent buffer storage, etc.

The following examples are set forth so as to provide those of ordinary skill in the art with a complete disclosure and description of how the present system is made, used and evaluated, and are intended to be purely exemplary of the invention and are not intended to limit the scope of what the inventor regards as the invention. Efforts have been made to ensure accuracy with respect to numbers (e.g., amounts, etc.) but some errors and deviations should be accounted for.

EXAMPLES

Example I

Figure 3:
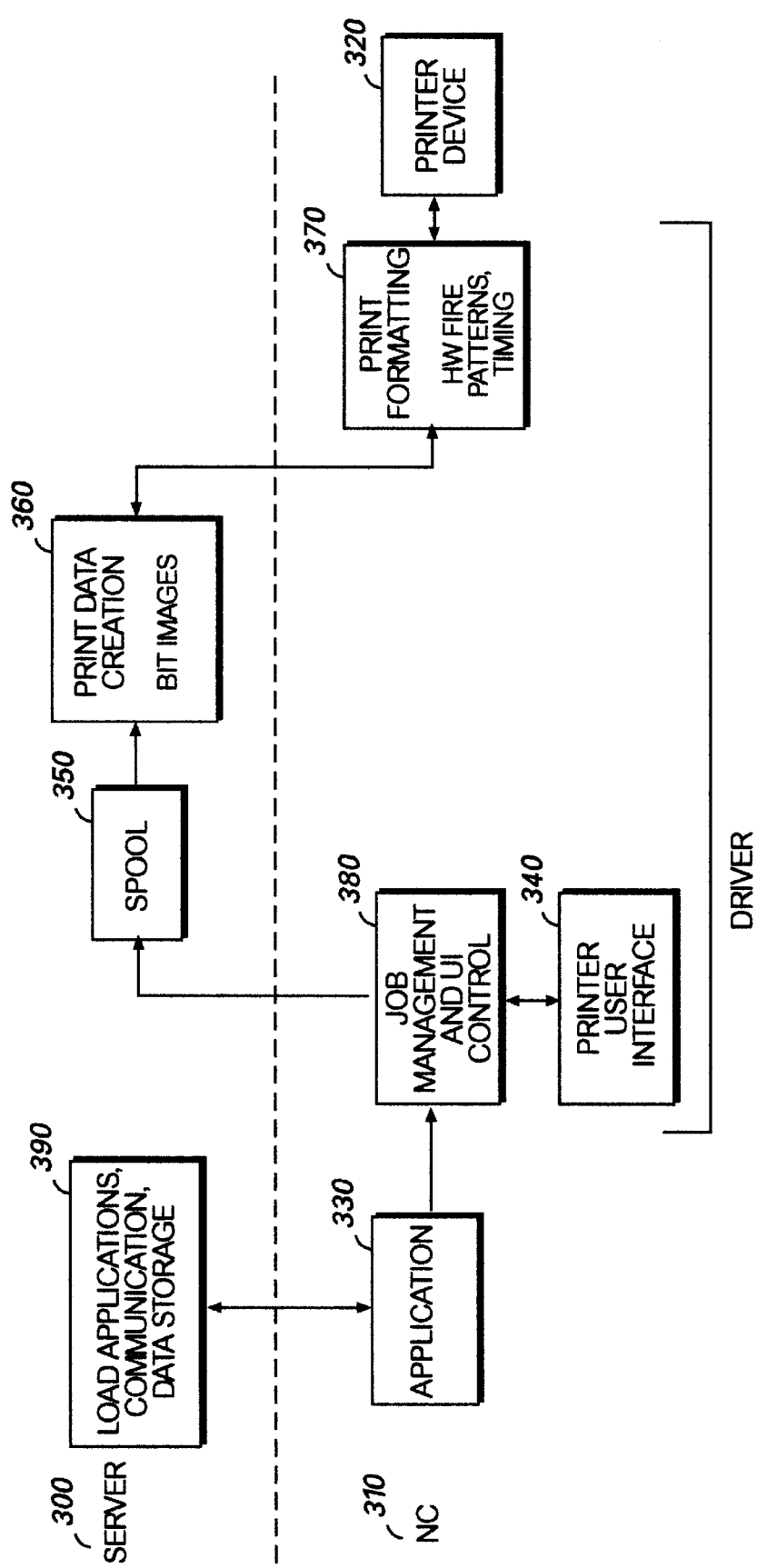
FIGS. 3–6 are block diagrams and process diagrams relating to a printer driver system of the present invention.

In one embodiment, the client/sever printer model operates as follows (in the context of an NC) (see FIG. 3, generally). The following functions are handled by the server 300: 1) application serving, communication, and data storage; 2) print job spooling 350; and 3) print data creation 360. The following functions are handled by the NC 310: 1) running of the application 330 requesting the printing, 2) Job Management and User Interface ("JMUI") control 380, 3) printer user interface 340, and 4) print formatting 370. The printer device 320 is generally connected to the NC 310 as shown. However, network printing is also feasible with the present system, simply by redirecting the formatted print data 370 to the appropriate communication channel and output means.

Upon request by the NC 310, the server 300 provides the application 330 executable for the NC 310 to run. The NC 310 operating the application 330 generates the print request. This request is presented, local to the NC 310, to a Job Management and User Interface control subsystem 380. This subsystem 380 is part of the printer driver 100. The JMUI subsystem 380 is aware of the printer user interface 340, which provides a user interface to the user of the system. The subsystem 380 forwards the printing request, over the network (not shown), to the server 300. At the server 300 side, the printing request is spooled 350 and the print data (generally bit images) is created 360 remote from the NC 310. Finally, the printing data is forwarded from the server 300 back to the NC 310 where final print formatting 370 is carried out. The printing device 320 that is local to the NC 310 (or attached via a network) receives the formatted print data and prints the job.

As is evident, this system eliminates the need for the NC to provide local memory or storage space for spooling of print jobs. The system also alleviates the NC from having to allocate processing and memory resources toward creating the actual print data.

Example II

Figure 4:
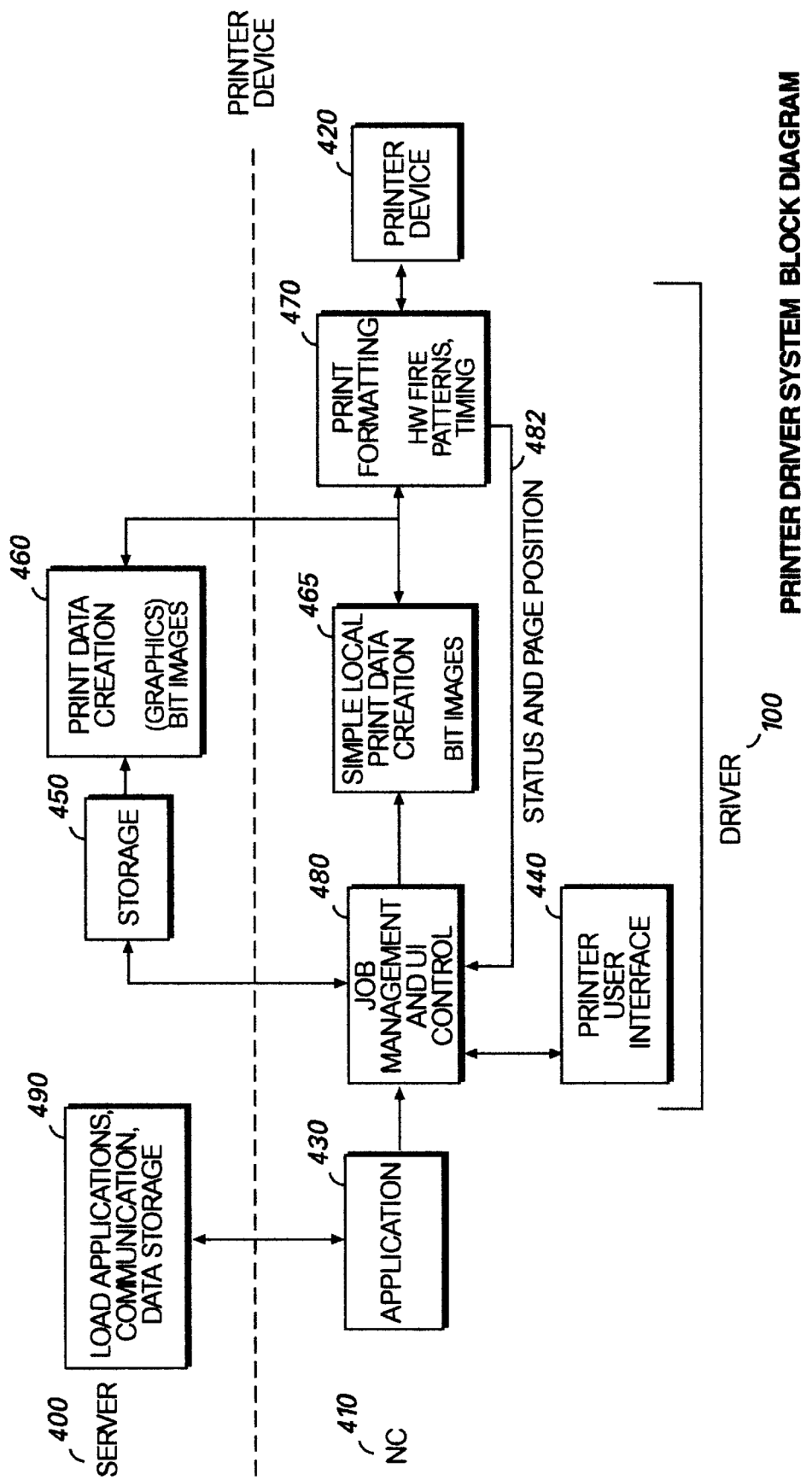

In a further embodiment (FIG. 4), the present invention provides yet another client/server printing system useful for NCs. In this model, the print data is characterized by the NC 410 portion of the print driver 100 and only those portions of the print job which require complex, remote processing are forwarded to the server 400. Thus, simple print data creation tasks are handled locally. This system provides the efficiency of local processing for those portions of print jobs do not overtax the NC. In this case, portions of the job may be split between the NC and the server on a "per page", "per band", "per swath", "per job" or any other basis, depending upon available resources. The complex portions of the print job are handled remotely, as with the above-described NC client/server print driver model. While the system is described in terms of simple and complex print job portions, this allocation is not absolute. For example, the division of labor criteria may be based on available memory (RAM), permanent storage, page orientation, etc.

In particular, the system operates as above in Example I, but with the following variations. First, the JMUI control subsystem 480 is extended to provide additional functionality. In particular, the JMUI subsystem 480 is now capable of determining whether the application print job is simple (e.g., text, having a small memory requirement) or complex (e.g., graphics, having a large memory requirement). The JMUI subsystem 480 forwards the complex portions to the server 400 for spooling 450 print data creation 460. The JMUI subsystem 480 maintains the simple portions at the NC 410 for local print data creation 465. Finally, the print formatting 470 is under the control of the JMUI subsystem 480, whereby the JMUI subsystem 480 is capable of monitoring necessary status and page position information 482 so as to ensure that the final printer 420 output represents complete page data from the data portions handled on both the server 400 and the NC 410 ("client") side. Thus, the JMUI 482 is responsible for reassembling the print data before forwarding the commands to the printing device 420 itself. In this example, only complex portions are forwarded to the server 400 and spooled 450 and processed 460 there.

Example III

Figure 5:
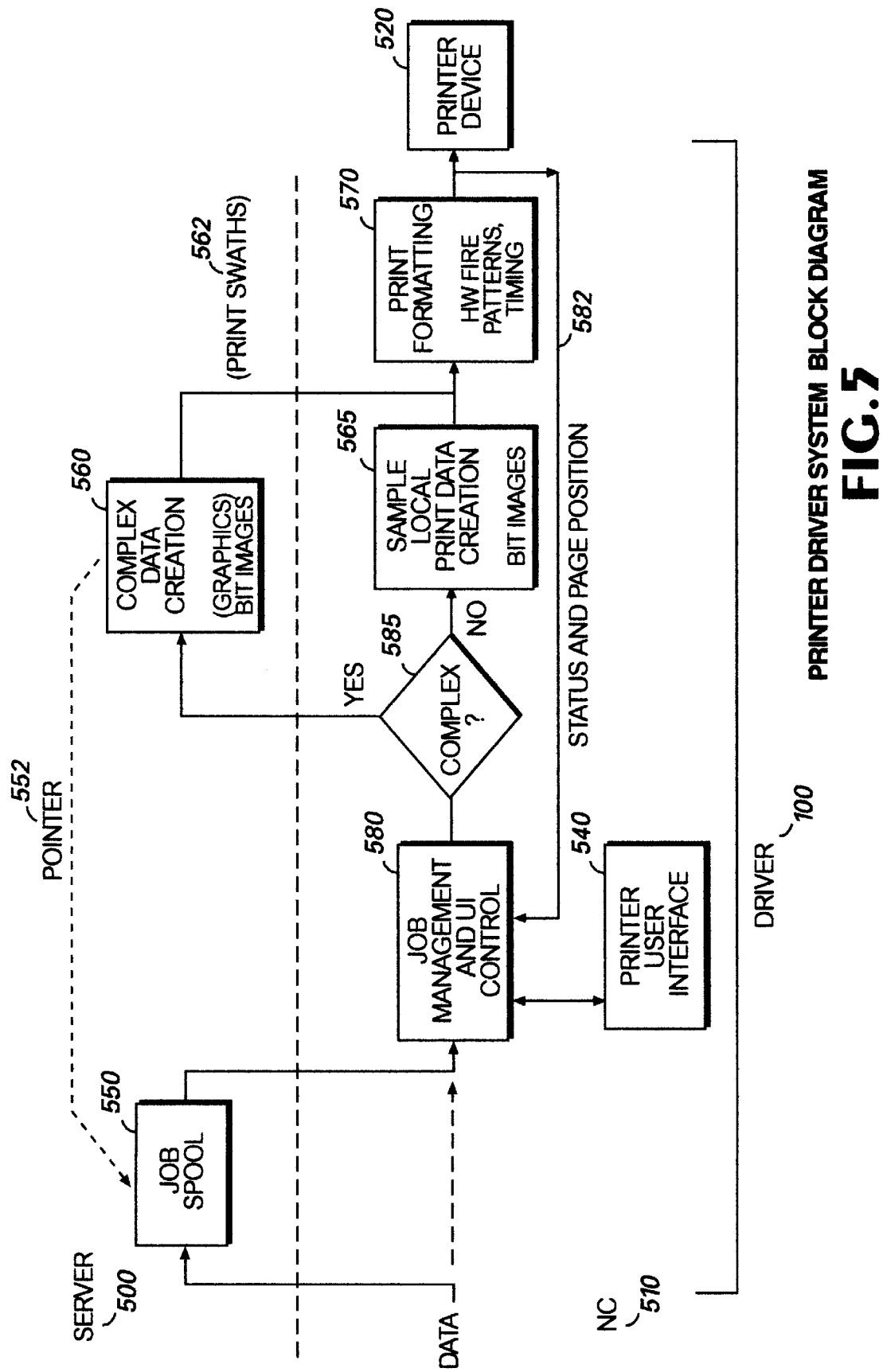

In a further example (FIG. 5), all print jobs from NC 510 applications 530 are immediately forwarded to the server 500 for spooling 550. In this embodiment, the JMUI subsystem 580 then receives the spooled job from the server 500, determines complexity 585, and allocates print data creation (560 or 565) based upon this determination. For simple print jobs, the data is created locally 565. However, for complex print jobs, the server 500 print data creation system 560 refers back 552 to the spooled print job 550 (also on the server 500 side) and uses that to create the print data 560 corresponding to the complex data, including print swath 562 or other data. The rest of the system is as described above.

Example IV

In addition, in another example, the present invention provides a further client/server print driver system suitable for operation in conjunction with NCs. This embodiment is shown substantially in FIG. 6.

For the global Internet, the additional communications traffic from NC print requests could be an impediment because each printing translation would require going out to the Internet and back. As an enhancement of the previous examples, the following example is presented which moves some of the basic (text and simple block graphics) driver image functionality back into the NC 610. Standard printing is done locally, without the need for LAN or Internet communications, and is therefore faster. On the other hand, the server 600 contains a portion of the driver 100 that is used for the creation of complex graphics images.

The server 600 loads the application 630 into the NC 610. The NC 610 application 630 that desires printing creates the print objects (e.g., GDI commands) targeted at a specific locally connected printer 620 or a remote printer (not shown). The driver 100 takes the data and determines, based on data type, how to create the print images as well as provides the user interface 640 to the customer. To minimize the impact of network delays on printing, storage and print data creation of simple objects (text, block graphics, etc.) are done locally 665 but the storage and creation of more complex graphics 660 are done at the server 600 because the server 600 has sufficient permanent storage and processing capacity to deal with large amounts of data. It may even be feasible for intelligent applications to pass pointers or indexes to complex bitmaps and other graphics that may be stored in the spooled data 650 to the driver rather than all the data. Application data may be delivered to spooler 650 or to local NC based upon data complexity so that complex large data blocks are never downloaded to the NC until they are formatted for printing. The driver portion of the present example is explained in more detail below.

Once data is received to print, the data is often stored 650 (spooled at the server 600) to allow the user to return to the application 630 sooner (this step may be omitted if the amount of data is very small). The job management section 680 of the driver selects the portion of the data to be printed, typically a section of a page identified by multiple print swaths, often called a band. This section identifies what print objects are within this print band and then manages creation of the print image data for this band, choosing either local image creation for simple text or initiating the creation of complex graphics data by the server 600. The server 600 responds with the graphical image data for the requested print bands. This graphics data 668 is then combined with any locally developed text or other data (from 665) to create the print band data 670. This print band data is then corrected for the printer mechanical and electrical characteristics (wire layout, spacing, timing, etc.) by print formatter 670 and then sent to the printer device 620.

By separating the driver image development between the NC and the server, a very simple, inexpensive printer can print complex graphics that are desired by the user that would not have been possible with the limited processing capability of the NC device. Also, simple printing is not limited or delayed by the network delays of the Internet.

Figure 6:
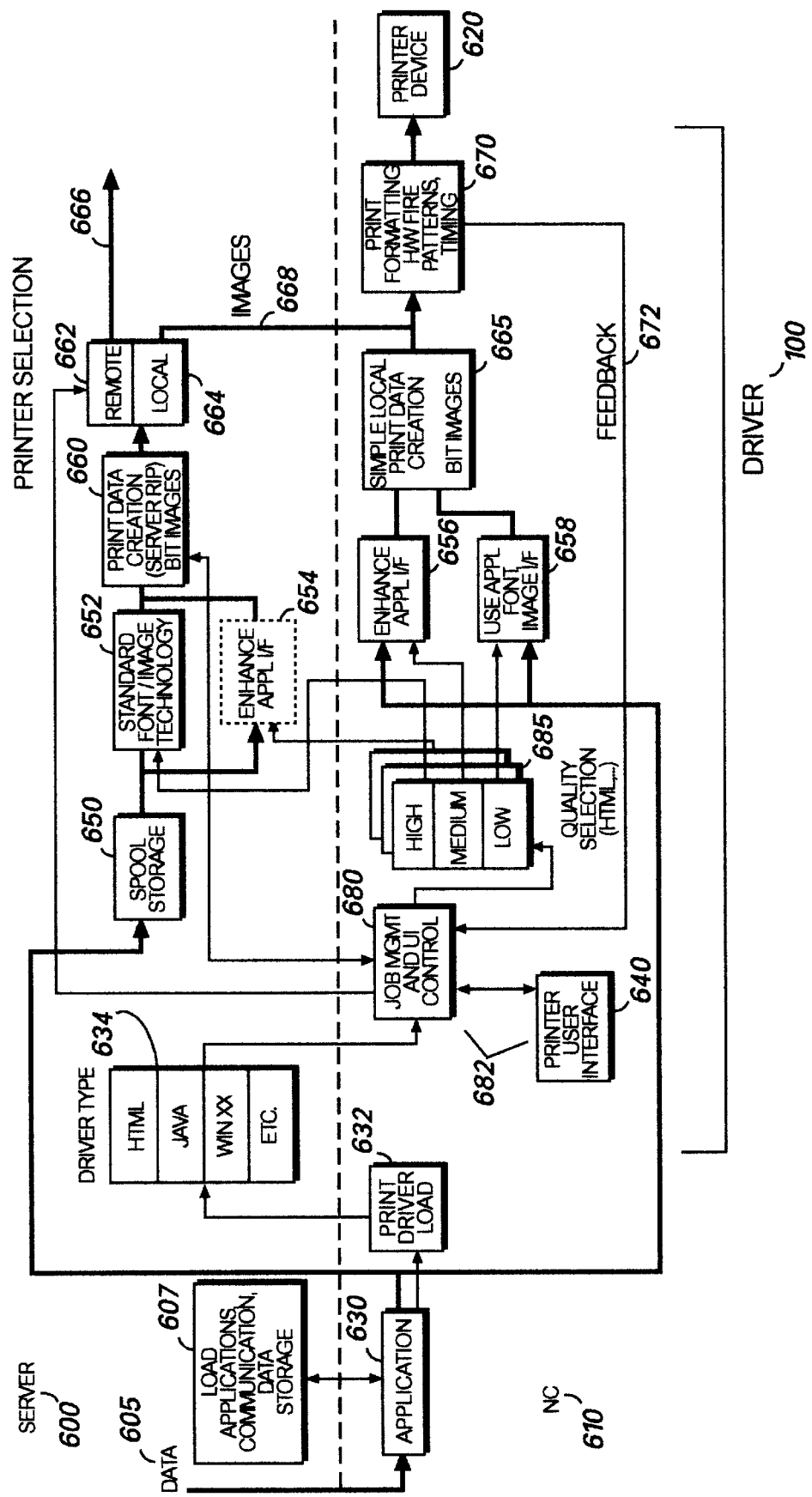

Referring now to FIG. 6, the server 600 is used to store document data, NC applications, the NC printer driver software, print spool storage, and standard image/font ("I/F") technology. The server 600 computer is capable of generating appropriate print data and is further capable of forwarding the print image either to a remote printer, or to the printer local to the NC 610. The NC 610 is responsible for running the application which requires the document data, requesting the loading of the appropriate print driver, JMUI control 682 (including the printer user interface 640), determining print quality, forwarding the print job data to the appropriate NC-local I/F technology (typically either from the application itself, or from an enhanced local interface) or to the server for its I/F technology, performing local print data creation, if necessary, and reassembling client-side and server-side print data portions for final assimilation and output to the printer device 620 attached to the NC 610 (or uploading the created print data to the server 600, network, or other device for remote printing or processing).

The client/server printer driver system operates as follows. Document data 605 is either loaded from the server 600 to the NC 610 or is generated by the user using a client-side operating application 630. This application software 630 may itself be downloaded 607 from the server 600, as is a standard feature of the NC system. The NC 610 thus runs the application 630, which has access to the document data 605. When the user of the application 630 requests to print the document data 605, the application 630 passes the document data 605 to a NC-side printer driver loading module 632. This module 632 determines what type of driver 634 should be loaded and then requests that the server 600 forward the appropriate driver software 634 to the client 610. This driver software 634 is used to manage the remainder of the print process.

In one embodiment, the document data 605 in the application is available to the server 600 as well as the client 610 print driver 100 subsystems. Thus, upon issuance of a print request by the application 630, the document data 605, in one embodiment, is automatically sent to spool storage 650 on the server 600. Alternately, this transfer can occur only once the server portion of the print driver is activated.

Once the driver software 634 is loaded, a JMUI subsystem 680 of the printer driver software is activated. The JMUI subsystem 680 is integrated with the printer user interface 640 and performs several functions. First, the JMUI subsystem 680 determines whether the document data 605 will require a "high," "medium," or "low" quality (complexity)

processing 685. One of skill in the art would recognize that the determination of "high," "medium," and "low" quality is arbitrary and that further and different distinctions could be made without altering the basic and novel characteristics of the present invention. Other criteria may also be used for splitting the print job between the client and server, including size, complexity, data type, etc. The JMUI subsystem 680 is capable of monitoring server-side processing tasks as well as NC-local printing tasks 672. Finally, the JMUI subsystem 680 is capable of instructing the server 600 whether to print to an NC-local printing device 664 or to a remote 662 printing device.

After the driver determines the print quality 685, the JMUI subsystem 680 forwards the document data to the appropriate image/font (I/F) subsystem (652, 654, 656, or 658). The I/F subsystems translate text and graphics data to positions on the page as bit image rasters. In one embodiment, the possible I/F subsystems include, but are not limited to, 1) application I/F technology 658, 2) enhanced NC-local I/F technology 656, 3) enhanced server-side I/F technology 654, and 4) standard server-side I/F technology 652. For instance, "low" quality jobs can be handled by application I/F technology 658, while "medium" quality jobs can be handled by enhanced NC-local I/F technology 656. Finally, "high" quality jobs can be referred to standard server-side I/F technology 652. In addition, the JMUI subsystem 680 may further determine that some or all of any job should be processed on the server 600 by the enhanced server-side I/F technology 654. In any event, the appropriate I/F subsystem is responsible for print data creation 660 on its input. Also, the determination of "low", "medium" and "high" quality may be dependent upon driver type.

On the server 600 side, the document data is retrieved from the spool storage 650. On the NC 610 or client side, the document data is loaded by the I/F subsystem (656 or 658) directly from the application 630. The various I/F subsystems are responsible for print data creation. The NC 610 is responsible for reassembling client and server side print data 670 from the I/F subsystems and formatting it for output to a printing device 620. However, when the JMUI subsystem 680 indicates that remote printing 662 is desired, the server created print data 660 is instead transferred to the server 600 where the final print data is sent to the appropriate remote printer (not shown).

This embodiment provides for the use of the power of the server for print spooling and allows for processing at higher quality than a wholly local NC system. In addition, LAN traffic (from NC to server) is greatly reduced by permitting processing of text and simple images locally. However, the embodiment is capable of high quality (complexity) printing if necessary or desired, at the expense of increased LAN traffic.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

I claim:

1. A system for processing a print job utilizing a client/server printer driver for use with a client-side computing means in communication with at least one server-side computing means, the system comprising:

(a) a client-side driver subsystem comprising means for transmitting the print job to a server-side driver subsystem of the server-side computing means;

(b) a server-side driver subsystem comprising:
      (i) means for receiving the print job from the client-side driver subsystem transmitting means;
      (ii) means for processing the print job to thereby create a processed server side print job; and
      (iii) means for transmitting the processed server-side print job to the client-side driver subsystem,
      wherein the client-side driver subsystem further comprises means for receiving the processed server-side print job from the server-side subsystem; and (c) means, in communication with the client-side driver subsystem, for outputting the processed print job to a signal processing means.

2. The system of claim 1, wherein the signal processing means comprises a printer capable of receiving and printing the print job.

3. The system of claim 1, wherein the client-side computing means is a network computer.

4. The system of claim 1, wherein the server-side computing means is a computer operating on a network.

5. The system of claim 4, wherein the network is a local area network.

6. The system of claim 4, wherein the network is the Internet.

7. A system for processing a print job utilizing a client/server printer driver for use with a client-side computing means in communication with at least one server-side computing means, the system comprising:

(a) a client-side driver subsystem comprising:
      (i) means for dividing the print job into one or more portions to be processed client-side, server-side, or a combination thereof;
      (ii) means, responsive to the dividing means, for transmitting the server-side portions of the print job to a server-side driver subsystem of the server-side computing means;
      iii) means for processing the client-side portions of the print job to thereby create one or more processed client-side print job portions; and
      iv) means for receiving the processed server-side print job portions;

(b) a server-side driver subsystem comprising:
      (i) means for receiving the server-side portions of the print job from the client-side driver subsystem transmitting means;
      (ii) means for processing the server-side portions of the print job to thereby create one or more processed server-side print job portions; and
      (iii) means for transmitting the one or more processed server-side print job portions to the client-side driver subsystem; and (c) means in communication with the client-side driver subsystem for outputting the processed client-side and server-side print job portions to a signal processing means.

8. The system of claim 7, wherein the signal processing means comprises a printer capable of receiving the client-side and server-side print job portions and printing the print job.

9. The system of claim 7, wherein the client-side computing means is a network computer.

10. The system of claim 7, wherein the client-side portions of the print job correspond to textual information.

11. The system of claim 7, wherein the server-side portions of the print job correspond to graphical information.

12. The system of claim 7, wherein the server-side computing means is a computer operating on a network.

13. The system of claim 7, wherein the dividing means further comprises means for determining the amount of communication between the client and server-side computing means and, if the amount is within a predetermined threshold range, dividing the print job whereby one or more portions to be processed client-side, server-side, or a combination thereof are favored based upon minimization of the communication between client and server-side computing means.

14. The system of claim 13, wherein the network is a local area network.

15. The system of claim 13, wherein the network is the Internet.

16. A client/server method of processing a print job for use with a client-side computing system in communication with at least one server-side computing system, the method comprising the steps of:

(a) transmitting, from the client-side, the print job to the server-side computing means;

(b) receiving, on the server-side, the print job from the client-side transmitting means;

(c) processing, on the server-side, the print job to thereby create a processed print job;

(d) transmitting, on the server-side, the processed print job to the client-side;

(e) receiving, on the client side, the processed print job; and (f) outputting the processed print job to a signal processing means.

17. The method of claim 16, wherein the signal processing means comprises a printer capable of receiving and printing the print job, the method further comprising receiving the print job and printing the print job on the printer.

18. The method of claim 16, wherein the client-side computing means is a network computer.

19. The method of claim 16, wherein the server-side computing means is a computer operating on a network.

20. The method of claim 19, wherein the network is a local area network.

21. The method of claim 19, wherein the network is the Internet.

22. A client/server method of processing a print job for use with a client-side computing means in communication with at least one server-side computing means, the method comprising the steps of:

(a) dividing, on the client-side, the print job into one or more portions to be processed client-side, server-side, or a combination thereof;

(b) transmitting, from the client-side, the server-side portions of the print job to the server-side computing means;

(c) processing, on the client-side, the client-side portions of the print job to thereby create one or more processed client-side print job portions;

(d) receiving, on the server-side, the server-side portions of the print job from the client-side transmitting means;

(e) processing, on the server-side, the server-side portions of the print job to thereby create one or more processed server-side print job portions;

(f) transmitting, on the server-side, the one or more processed server-side print job portions to the client-side;

(g) receiving, on the client side, the processed server-side print job portions; and (h) outputting the processed client-side and server-side print job portions to a signal processing means.

23. The method of claim 22, wherein the signal processing means comprises a printer capable of receiving the client-side and server-side print job portions and printing the print job.

24. The method of claim 22, wherein the client-side computing means is a network computer.

25. The method of claim 22, wherein the client-side portions of the print job correspond to textual information.

26. The method of claim 22, wherein the server-side portions of the print job correspond to graphical information.

27. The method of claim 22, wherein the server-side computing means is a computer operating on a network.

28. The method of claim 22, wherein the dividing step further comprises determining the amount of communication between the client and server-side computing means and, if the amount is within a predetermined threshold range, dividing the print job whereby one or more portions to be processed client-side, server-side, or a combination thereof are favored based upon minimization of the communication between client and server-side computing means.

29. The method of claim 27, wherein the network is a local area network.

30. The method of claim 27, wherein the network is the Internet.

* * * * *